(12) United States Patent
Salapski

(10) Patent No.: US 7,668,254 B2
(45) Date of Patent: *Feb. 23, 2010

(54) REAL TIME DYNAMIC CORRELATOR FOR EVALUATING ELECTRICAL CHARACTERISTICS OF A TRANSMITTER

(75) Inventor: George D. Salapski, Tustin, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/329,426

(22) Filed: Dec. 5, 2008

(65) Prior Publication Data

US 2009/0141785 A1 Jun. 4, 2009

Related U.S. Application Data

(60) Continuation of application No. 11/894,911, filed on Aug. 22, 2007, now Pat. No. 7,477,701, which is a division of application No. 10/446,960, filed on May 27, 2003, now Pat. No. 7,280,608.

(51) Int. Cl.
 *H04L 27/04* (2006.01)
(52) U.S. Cl. ...................................... 375/295; 375/297
(58) Field of Classification Search .......... 375/295–297
 See application file for complete search history.

(56) References Cited

U.S. PATENT DOCUMENTS

| 3,670,151 | A | | 6/1972 | Lindsay et al. |
| 3,952,163 | A | | 4/1976 | Couturier et al. |
| 4,223,270 | A | | 9/1980 | Schmid et al. |
| 4,558,453 | A | | 12/1985 | Mimken |
| 4,667,203 | A | | 5/1987 | Counselman, III |
| 5,978,412 | A | * | 11/1999 | Takai .......................... 375/145 |
| 6,175,433 | B1 | | 1/2001 | Patel et al. |
| 6,335,951 | B1 | | 1/2002 | Cangiani et al. |
| 6,389,438 | B1 | * | 5/2002 | Zhou .............................. 708/3 |
| 6,424,289 | B2 | * | 7/2002 | Fukae et al. ................... 342/27 |
| 6,510,173 | B1 | * | 1/2003 | Garmonov et al. ........... 375/141 |
| 6,757,525 | B1 | | 6/2004 | Ishikawa et al. |
| 6,885,209 | B2 | | 4/2005 | Mak et al. |
| 7,272,162 | B2 | * | 9/2007 | Sano et al. ................... 375/135 |

* cited by examiner

*Primary Examiner*—Emmanuel Bayard
(74) *Attorney, Agent, or Firm*—Toler Law Group

(57) ABSTRACT

Systems and methods for evaluating electrical characteristics of a transmitter in real time are provided. A particular system includes a code generator configured to generate reference code and test code. The reference code and test code both include a plurality of frames of data. The code generator is further configured to output the reference code at a first rate and to output the test code at a second rate that is different than the first rate. The system also includes a modulator configured to modulate the reference code into a first modulated code. The system further includes a correlator configured to correlate the first modulated code with test code that has been modulated and transmitted by a transmitter as a second modulated code.

19 Claims, 17 Drawing Sheets

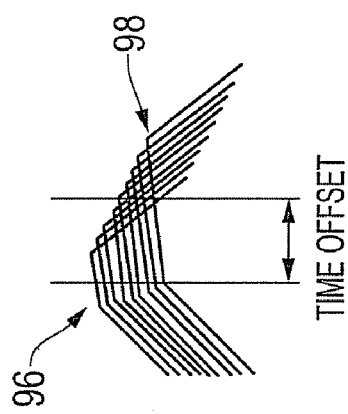
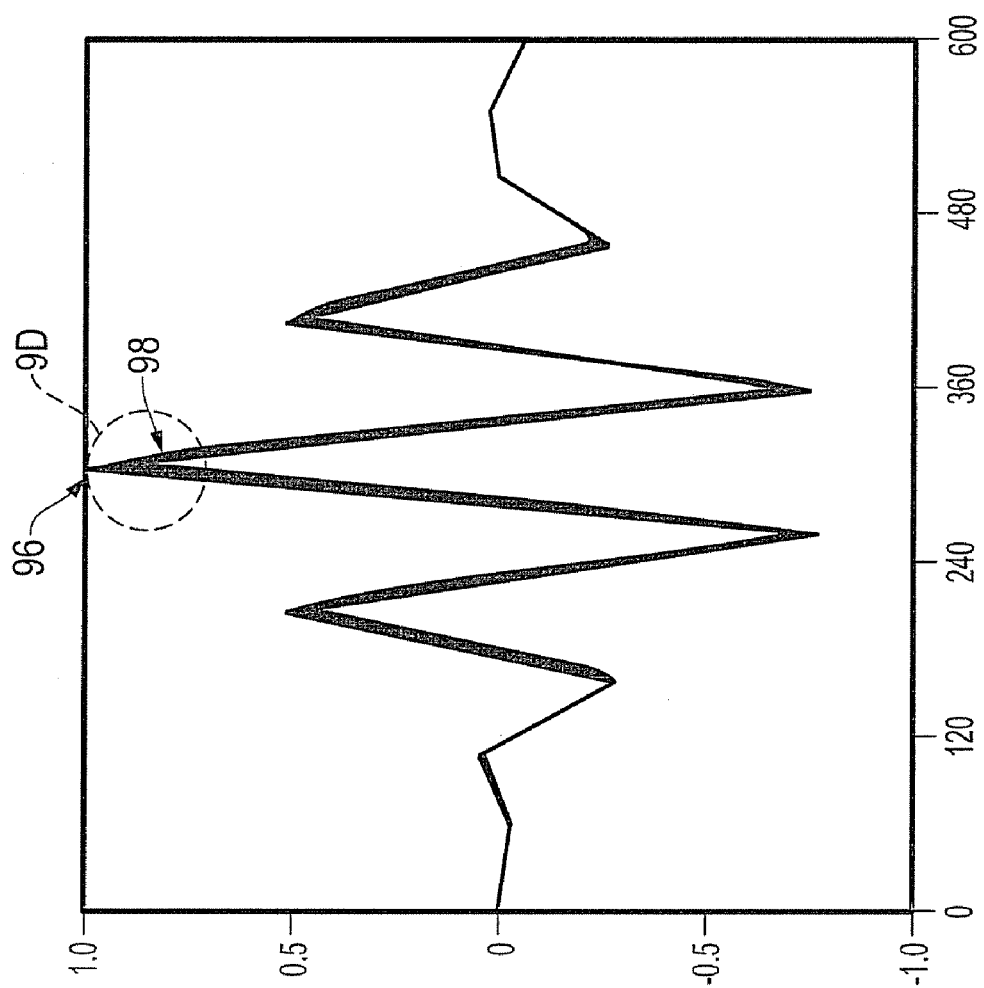
FIG. 9D
FIG. 9C

1

REAL TIME DYNAMIC CORRELATOR FOR EVALUATING ELECTRICAL CHARACTERISTICS OF A TRANSMITTER

CROSS REFERENCE TO RELATED APPLICATIONS

The present application is a continuation application of and claims priority to U.S. patent application Ser. No. 11/894,911 filed on Aug. 22, 2007 and entitled "REAL TIME DYNAMIC CORRELATOR", the contents of which are expressly incorporated herein by reference in their entirety, which is a divisional application of and claims priority to U.S. patent application Ser. No. 10/446,960 filed on May 27, 2003, now U.S. Pat. No. 7,280,608 and entitled "REAL TIME DYNAMIC CORRELATOR", the contents of which are expressly incorporated herein by reference in their entirety.

FIELD OF THE DISCLOSURE

The present disclosure relates generally to testing electrical devices and, more specifically, to testing transmitters.

BACKGROUND

It is often desirable to evaluate capabilities and electrical characteristics of electrical equipment, such as transmitters. Such an evaluation can provide an indication of the operating condition of the equipment. When the equipment being tested is a transmitter, an evaluation of the transmitter's electrical characteristics typically involves correlation of a reference signal with data and a signal that is being transmitted by the transmitter.

An example of such a correlation is cross-correlation. As is known, cross-correlation is a standard method of estimating the degree to which two series of data are correlated. For two series $x(i)$ and $y(i)$, where $i=0, 1, 2, \ldots n-1$ and $mx$ and $my$ are means of the correspondence series, the cross-correlation $r$ is given by the formula:

$$r = \frac{\sum_i [x(i) - mx] * (y(i-d) - my)]}{\sqrt{\sum_i (x(i) - mx)^2} \sqrt{\sum_i y(i-d) - my)^2}}$$

In equation (1), the term "d" represent the group delay between the comparing signals. For this application, the latency between the reference signal and the received data streams is d=0. FIG. 1 shows an exemplary graph 10 of correlation of two series of data. A first series of data is a pulse 12, and a second series of data is a pulse 14. Correlation of the pulses 12 and 14 is shown in a correlation series 16. It will be appreciated that the pulse 14 is being "slid" past the pulse 12. At each shift, the sum of the product of the newly lined-up terms in the series is solved. The sum is large when the delay shift is such that similar structures line up or coincide. In the exemplary graph 10, maximum correlation is achieved for a delay of 3—that is, when the pulses 12 and 14 line up or coincide with each other. As is also known, maximum correlation is normalized to a value +1 and an anti-correlation normalizes to a value of −1.

Current methods of determining electrical characteristics using cross-correlation techniques employ manual derivation of electrical characteristics. Another current method entails extensive post-processing of the transmitted signal.

In the current methods, once the delays are encountered, therefore, any transmitter problems will not be known while the transmitter is in use. As such, the transmitter can be used with faults that are unknown, because the transmitter cannot be tested until after a lengthy delay.

It would therefore be desirable to evaluate a transmitter's capabilities and electrical characteristics in real-time. However, there is an unmet need in the art for evaluating a transmitter's capabilities and electrical characteristics in real time.

SUMMARY

Embodiments disclosed provide methods and systems for evaluating electrical characteristics of a transmitter in real time using cross-correlation of a reference signal with a signal transmitted by the transmitter. In one exemplary embodiment, a system includes a code generator that is configured to generate reference code and test code that each include a plurality of frames of data. The reference code is output at a first rate and the test code is output at a second rate that is different from the first rate. A modulator is configured to modulate the reference code into a first modulated code. A correlator is configured to correlate the first modulated code with test code that has been modulated and transmitted by a transmitter.

According to a particular embodiment, the code generator allows for flexible implementation of various modulation techniques and may include an ultra-high speed and high density field programmable gate array. The modulation techniques may include binary offset carrier modulation codes, including BOC (10,5). The modulation techniques may also include pulse width modulation, pulse code modulation, pulse repetition frequency, pulse position modulation, time division multiple access, code division multiple access, and Manchester coded frequency hop modulation. According to another particular embodiment, the code generator also allows for investigation of various hardware parameters, such as variable signal rise times, variable sub-carrier duty cycles, subcarrier-to-code timing offsets, phase noise and jitter effects, filter ambiguity through modulation and transmission, and phase ambiguity.

According to a particular embodiment, a system for evaluating electrical characteristics of a transmitter in real time includes a code generator. The code generator generates reference code and test code. The code generator outputs the reference code at a first rate and outputs the test code at a second rate that is different than the first rate. The system also includes a correlator configured to correlate reference data and test data. The reference data is generated from the reference code, and the test data includes an output of a transmitter under test after the test code is processed by the transmitter.

According to another particular embodiment, a method of evaluating electrical characteristics of a transmitter in real time includes generating reference code and test code. The reference code is output at a first rate and the test code is output at a second rate that is different from the first rate. The method also includes modulating the reference code into a first modulated code. The test code is provided to a transmitter, and the first modulated code is correlated with a second modulated code. The second modulated code includes output of the transmitter based on the transmitter modulating the test code.

In a particular embodiment, actual satellite radio frequency hardware can be inserted into the system for characterization. A transmitter high power amplifier can be tested for non-linear gain and saturation characteristics, such as AM-to-PM and PM-to-PM conversion effects. Phase characteristics of the high power amplifier can also be evaluated. Further, satellite output filters, such as triplexer, diplexer, and quadraplexer filters, can be evaluated. The satellite output filters can be evaluated for band limiting effects, non-linear phase and group delay effects, and thermal drift of filter center frequency.

BRIEF DESCRIPTION OF THE DRAWINGS

The preferred and alternative embodiments are described in detail below with reference to the following drawings.

FIGS. 9A, 9B, 9C, and 9D are further screen shots of correlation of BOC (10,5) code.

DETAILED DESCRIPTION

By way of overview, embodiments disclosed provide methods and systems for evaluating electrical characteristics of a transmitter in real time using cross-correlation of a reference signal with a signal transmitted by the transmitter. In one exemplary embodiment, a system includes a code generator that is configured to generate reference code and test code that both include a plurality of frames of data. The reference code is output at a first rate and the test code is output at a second rate that is slower than the first rate. A modulator is configured to modulate the reference code into a first modulated code. A correlator is configured to correlate the first modulated code with test code that has been modulated and transmitted by a transmitter when a frame of data in the first modulated code coincides with a same frame of data in the second modulated code.

Figure 2:
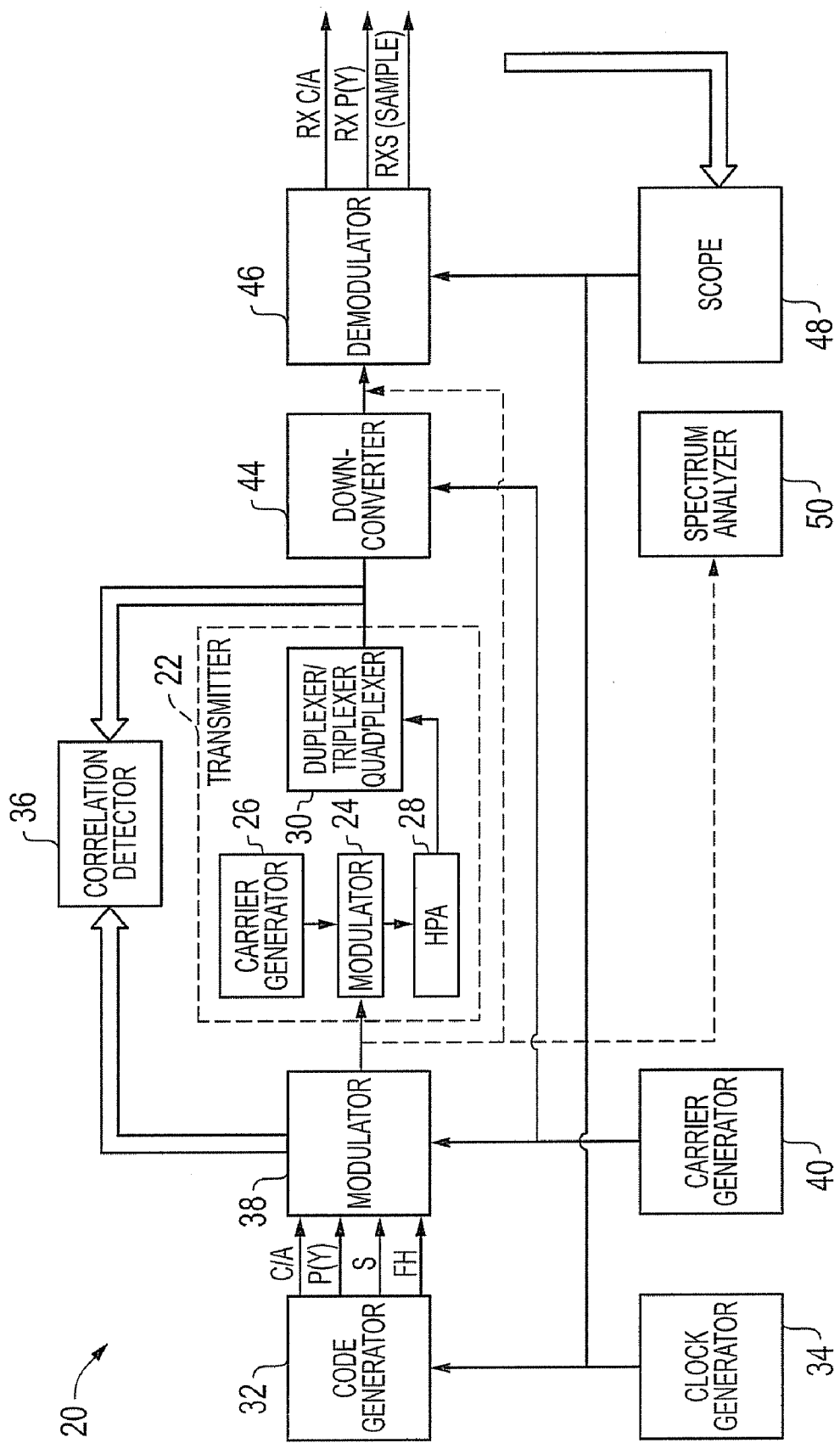
FIG. 2 is a high level block diagram of a particular system.

FIG. 2 is a block diagram of an exemplary system 20 for evaluating electrical characteristics of a transmitter 22 in real time. It will be appreciated that the transmitter 22 is not part of the system 20. Rather, the transmitter 22 is a unit under test that is evaluated by the system 20. As such, the transmitter 22 is any acceptable digital transmitter, such as without limitation a satellite transmitter like a global positioning system (GPS) transmitter. Because digital transmitters are well known in the art, a detailed description of the construction and operation of the transmitter 22 is not necessary for an understanding of the operation of the system 20. Briefly, the transmitter 22 includes a modulator 24 that accepts an incoming code stream as input. A carrier generator 26 supplies a carrier frequency to the modulator 24 in a well-known manner. Given by way of non-limiting example, the carrier frequency may be in the L band from 1.2 GHz to 1.6 GHz. However, any carrier frequency may be used as desired for a particular application. The modulator 24 modulates the incoming data stream with the carrier frequency in a well-known manner and provides the modulated code stream to a well-known high power amplifier 28. The amplified and modulated code stream is provided to output filters 30, such as without limitation diplexer, triplexer, or quadraplexer filters.

Because the transmitter 22 advantageously is inserted into the system 20 as a unit under test, the actual hardware of the transmitter 22 can characterized. For example, characteristics such as non-linear gain and saturation characteristics, like AM-to-PM and PM-to-PM conversion effects of the high power amplifier 28, can be evaluated. Further, band limiting effects, non-linear phase and group delays effects, and thermal drift of center frequency of the output filters 30 can be evaluated.

According to a particular embodiment, a code generator 32 generates a code stream that is provided to the transmitter 22 as a test data stream. The code generator 32 also generates a reference data stream against which the output of the transmitter 22 will be correlated. The code generator 32 is suitably any acceptable pseudo random code generator that is known in the art. The code generator 32 generates digital code streams in a variety of formats, such as without limitation CA code, P code, S code, and Manchester code such as frequency hop code as desired for a particular application. The code generator 32 is clocked by a clock generator 34. Given by way of non-limiting example, in one embodiment the clock generator 34 suitably generates a clock pulse with a frequency of 10.23 MHz. However, it will be appreciated that any clock frequency may be used as desired for a particular application.

According to a particular embodiment, the code generator 32 generates a test stream of data that is provided to the transmitter 22, where the test stream of data is modulated, amplified, filtered, and provided to a correlator 36. As will be explained in detail further below, outputting of the test stream of data to the transmitter 22 is clocked at the clock frequency of the clock generator 34. The code generator 32 also generates a reference code, against which the output of the transmitter 22 is correlated by the correlator 36.

Figure 3:
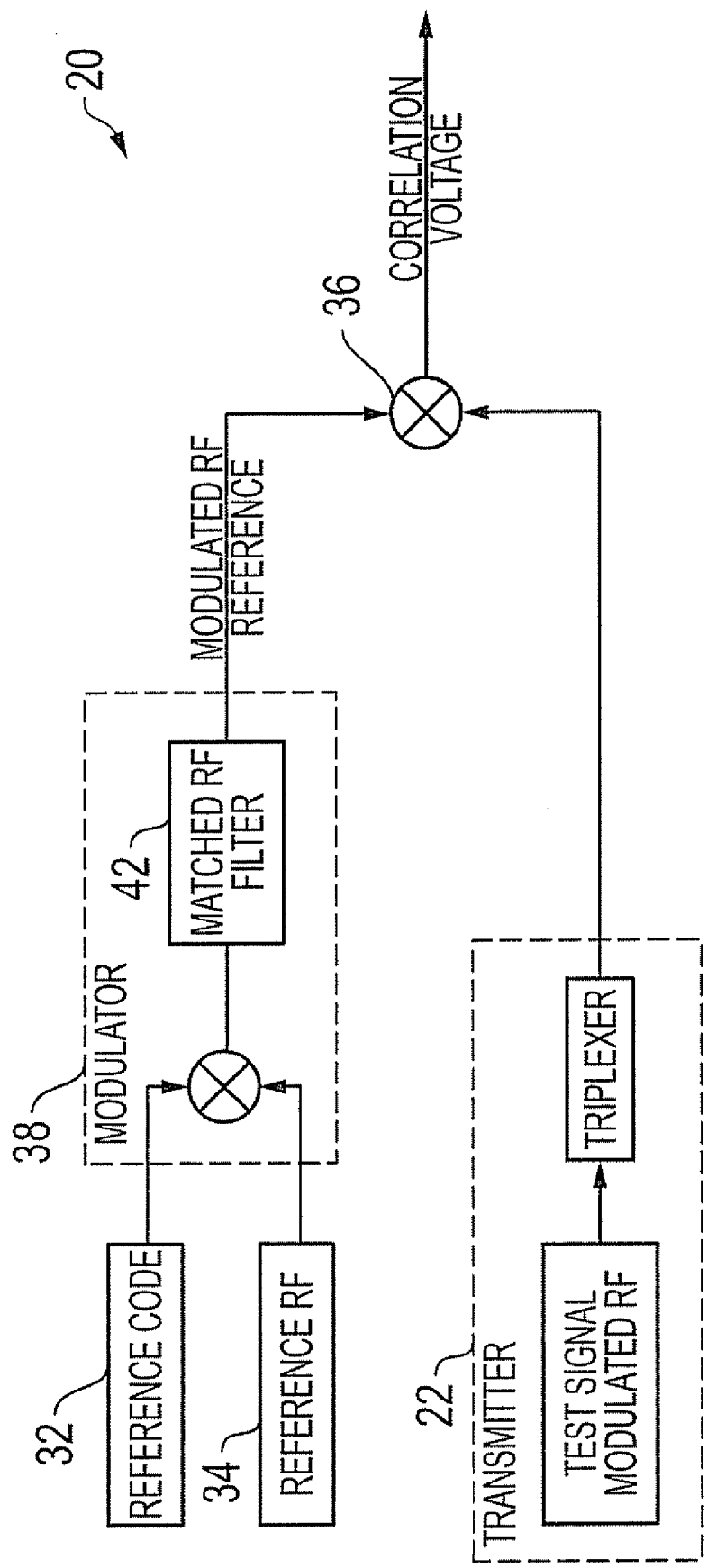
FIG. 3 is a detailed block diagram of portions of the system of FIG. 2.

Because the output of the transmitter 22 is a modulated signal, the reference code generated by the code generator 32 is also modulated. This permits the reference code and the test code to be correlated against each other. A modulator 38 modulates the reference code from the code generator 32 with a carrier frequency from a carrier generator 40. As discussed above, the system 20 advantageously evaluates characteristics of actual hardware of the transmitter 22 that is inserted into the system 24 testing. Therefore, the modulator 38 and the carrier generator 40 are matched as closely as possible to the modulator 24 and carrier generator 26 of the transmitter 22. Further, referring now to FIGS. 2 and 3, the modulator 38 also suitably includes a filter 42 that is matched as closely as possible with the output filters 30 of the transmitter 22. That is, the filter 42 is a diplexer, triplexer, or quadraplexer filter, as the case may be, as determined by the output filters 30 of the transmitter 22. Further, in order to reduce introduction of variables by the modulator 38 such that correlation results can be attributed to the characteristics of the transmitter 22, further electrical characteristics of the filter 42, such as without limitation a number of poles, center frequency, and corner frequencies are matched as closely as possible to those of the output filter 30 of the transmitter 22.

Figure 3A:
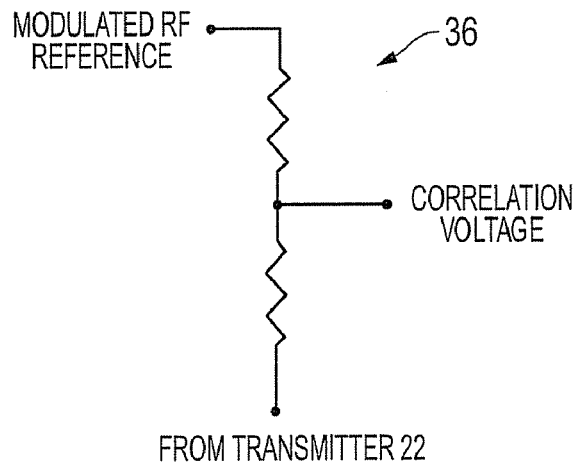
FIGS. 3A, 3B, and 3C schematically illustrate exemplary alternative details of portions of the system of FIG. 2.
Figure 3B:
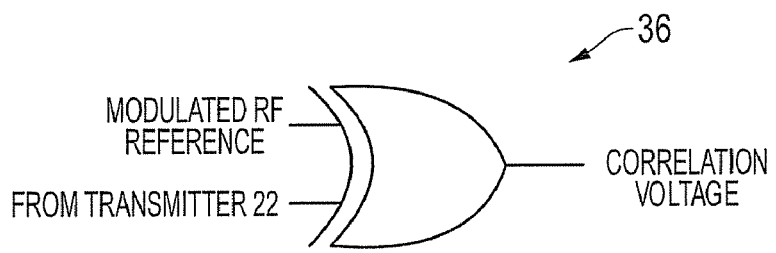
Figure 3C:
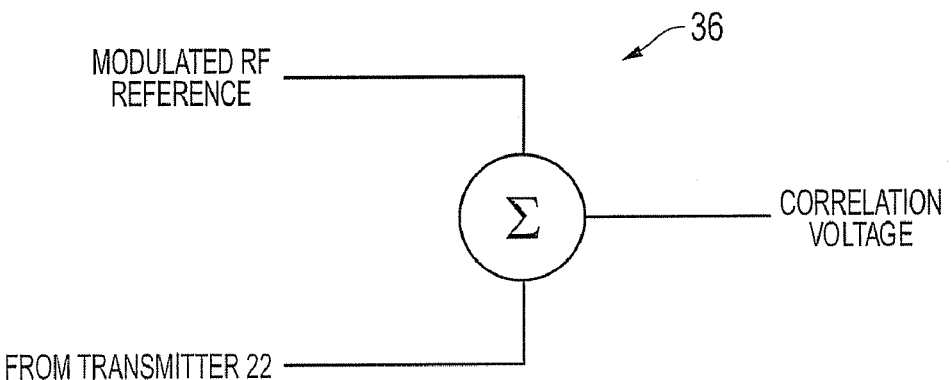

According to a particular embodiment, the output of the transmitter 22 is correlated with the modulated reference code that is output by the modulator 38. The correlator 36 suitably performs a cross-correlation in a known manner. Accordingly and briefly referring additionally to FIGS. 3A, 3B, and 3C, the correlator 36 is suitably implemented in a number of embodiments such as without limitation a mixer, two resistors connected to a scope, an exclusive OR (XOR) gate, or two summing inputs of an operational amplifier. In one presently preferred embodiment, the correlator 36 includes two channels of an oscilloscope, such as without limitation an Infinium digital oscilloscope.

It will be appreciated that the correlation function is performed and, if desired, displayed in the frequency domain. In addition, it may be desirable to observe the generated data streams in the time domain. To that end, and referring back to FIG. 2, a down converter 44 down-coverts the output of the transmitter 22 to a lower frequency band. A demodulator 46 demodulates the down-converted signal. The demodulated and down-converted output of the transmitter 22 is displayed on a suitable oscilloscope 48.

If it is desired to observe the frequency spectrum of the modulated reference code, a spectrum analyzer 50 may be coupled to receive the modulated reference code from the modulator 38. Further, if desired to observe the frequency spectrum of the output of the transmitter 22, the spectrum analyzer may be coupled to receive the output of the transmitter 22.

Figure 4:
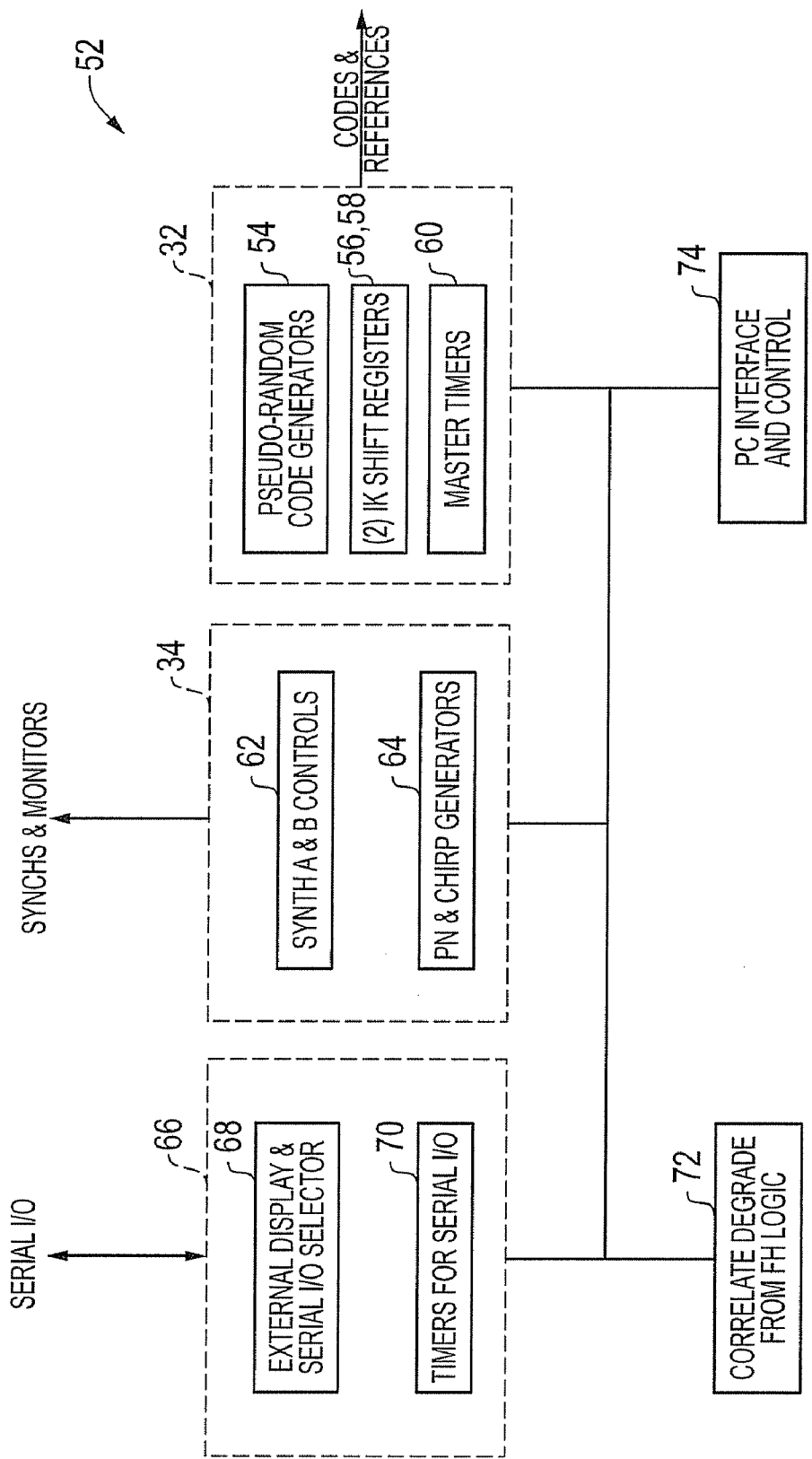
FIG. 4 is a detail of a component of a field programmable gate array.

Referring now to FIG. 4, in one presently preferred embodiment, many of the code generator functions are suitably performed by a field programmable gate array (fpga), such as without limitation and Altera fpga. In one exemplary non-limiting example, an fpga 52 implements the code generator 32. The code generator 32 includes a pseudo-random code generator 54, two shift registers 56 and 58, and a master timer 60. The shift registers 56 and 58 will be discussed in detail below. The fpga 52 also suitably implements the clock generator 34. The clock generator 34 includes SYNTH A&B controls 62 and a PN and chirp generator 64. In one present embodiment, the SYNTH A & B controls 62 set the frequencies of two synthesizers such that one frequency is faster than the other frequency so the eventually-captured waveform fills the horizontal screen of digital sampling oscilloscopes. The PN and chirp generator 64 is a pseudo random number generator that can be used in lieu of source code of a transmitter under test (provided the transmitter under test can accept external data input.) In one present embodiment, the PN and chirp generator 64 is a Frequency Hop that is constantly incrementing by a fixed value, such as around 6.00 Mhz then 6.01 MHz then 6.02 MHz, etc., until it reaches its end. Then, the PN and chirp generator 64 starts all over again (hence the name "chirp"). The PN and chirp generator 64 is also used as an external source for a transmitter under test that can accept external data input.

The fpga 52 also includes a serial input/output (I/O) interface 66. The serial I/O interface 66 includes a serial I/O selector 68 and a timer 70 for serial I/O functionality. As will be discussed in detail below, the serial I/O interface 66 is used for, among other things, serially loading the code stream from the shift register 56 to the shift register 58.

In one exemplary embodiment, the fpga 52 also includes a frequency hop logic processor 72. The frequency hop logic processor 72 correlates degrades from frequency hop logic. Correlation degradation is a counter that detects a number of mismatches that have occurred between two frequency hop sources (that is, reference data stream and test data stream) that are being correlated.

A computer interface 74 provides functionality for selecting various parameters for the code stream or for the correlation function. For example, the computer interface 74 suitably permits selecting a number of delays of frames of data in the code stream, or frequency values going into the shift registers 56 and 58, or the like.

Figure 1:
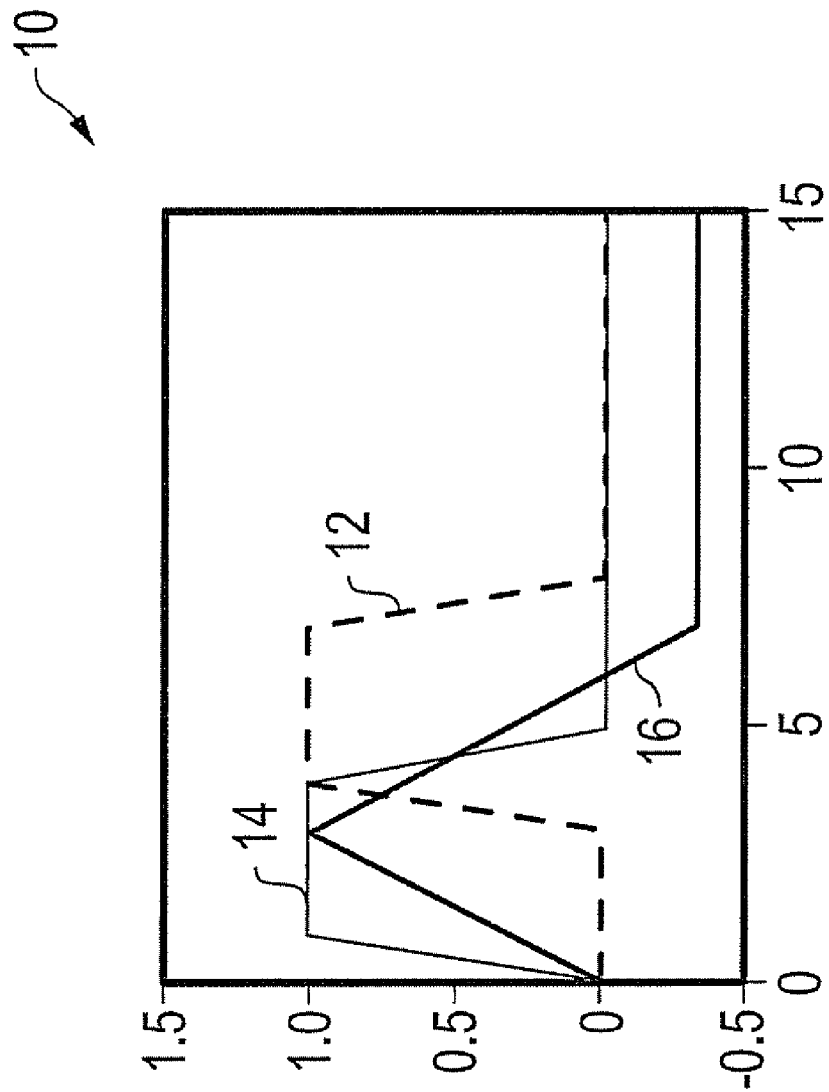
FIG. 1 is an example of prior art correlation.
Figure 5:
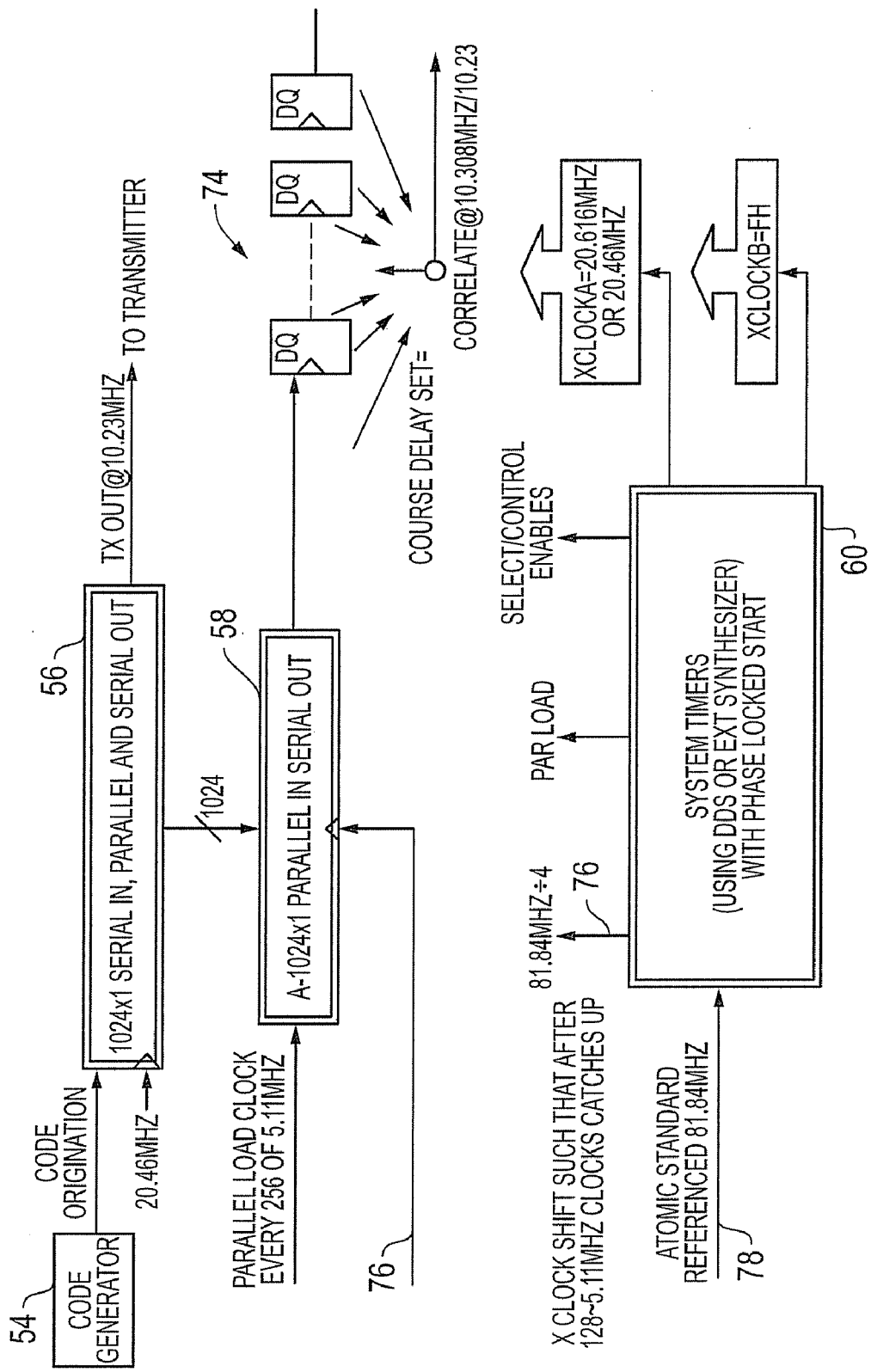
FIG. 5 is a block diagram of the field programmable gate array.

Referring now to FIG. 5, details will now be set forth regarding the test code that is supplied to the transmitter 22 (FIG. 1), the reference code, and the shift-registers 56 and 58.) A digital code stream having data frames, or chips, that is generated by the pseudo-random code generator 54 (FIG. 4) is provided as serial input to the shift register 56. As discussed above, the digital code stream is suitably formatted in any desirable format, such as without limitation CA, P, S, or Manchester code such as frequency hop. While any acceptable code format may be used as desired, for sake of brevity and clarity, a non-limiting example of S code will be discussed below. In one non-limiting example, the shift register 56 is clocked by the clock generator 34 (FIG. 2) at around 20.46 MHz. The code stream is output from the shift register 56 as a serial code stream at around 10.23 MHz. The output of the shift register 56 is supplied to the transmitter 22. As such, the output of the shift register 56 is the test data stream. The test data stream output by the shift register 56 is provided to the transmitter 22, the output of which is provided to the correlator 36. The shift register 56 is suitably any shift register configured to accept serial input and output data as both serial and parallel data streams. In one exemplary embodiment, the shift register 56 is a 1 Kbyte (1024) shift register. However, it will be appreciated that a shift register of any size may be used as desired for a particular application.

The shift register 58 receives and loads the parallel output from the shift register 56. The master timer 60 generates a parallel load clock that is applied to the shift register 58. In one embodiment, the parallel load clock causes the parallel data to be loaded from the shift register 56 into the shift register 58 every 256 pulses of a 5.11 MHz clock. The shift register 58 provides its output as serial output. According to a particular embodiment, the shift register 58 advantageously is clocked to output its serial data faster than the shift register 56 outputs its serial data. Given by way of non-limiting example, the output of the shift register 58 is suitably clocked at around 10.308 MHz. As such, in this non-limiting example the serial data stream that is output at 10.308 MHz from the shift register 58 is the reference code stream. The reference code from the shift register 58 is modulated by the modulator 38 and is provided to the correlator 36. Advantageously, data chips (or frames of data) of the reference data stream from the shift register 58 begin to "catch up" to the data chips of the test data stream from the shift register 56. At a predetermined data chip, the test data stream and the reference data stream advantageously coincide. Given by way of non-limiting example, the master timer 60 generates a clock shift signal 76 that is provided to the shift register 58 such that after 128 pulses of the 5.11 MHz clock, the reference data stream output from the shift register 58 catches up with the test data stream from the shift register 56. In one exemplary embodiment, the system timer generates the clock shift signal 76 from an atomic standard signal 78 at 81.84 MHz. The master timer 60 divides the reference signal 78 by factor of 4 for the clock shift signal 76. However, it will be appreciated that any clock shift signal may be provided as desired for a particular application. As mentioned previously, the computer interface 74 (FIG. 4) permits selecting a number of data chip delays. By varying the delay of data chips output from the shift register 58, a user can select which data chip of the reference data stream that is serially output from the shift register 58 that will coincide with the corresponding data chip from the test data stream that is serially output from the shift register 56 when the reference data stream "catches up" with the test data stream. Advantageously, when the data chips in the modulated reference data stream and the modulated test data stream coincide, the correlator 36 advantageously performs cross-correlation on the coincident data chips.

Figure 6A:
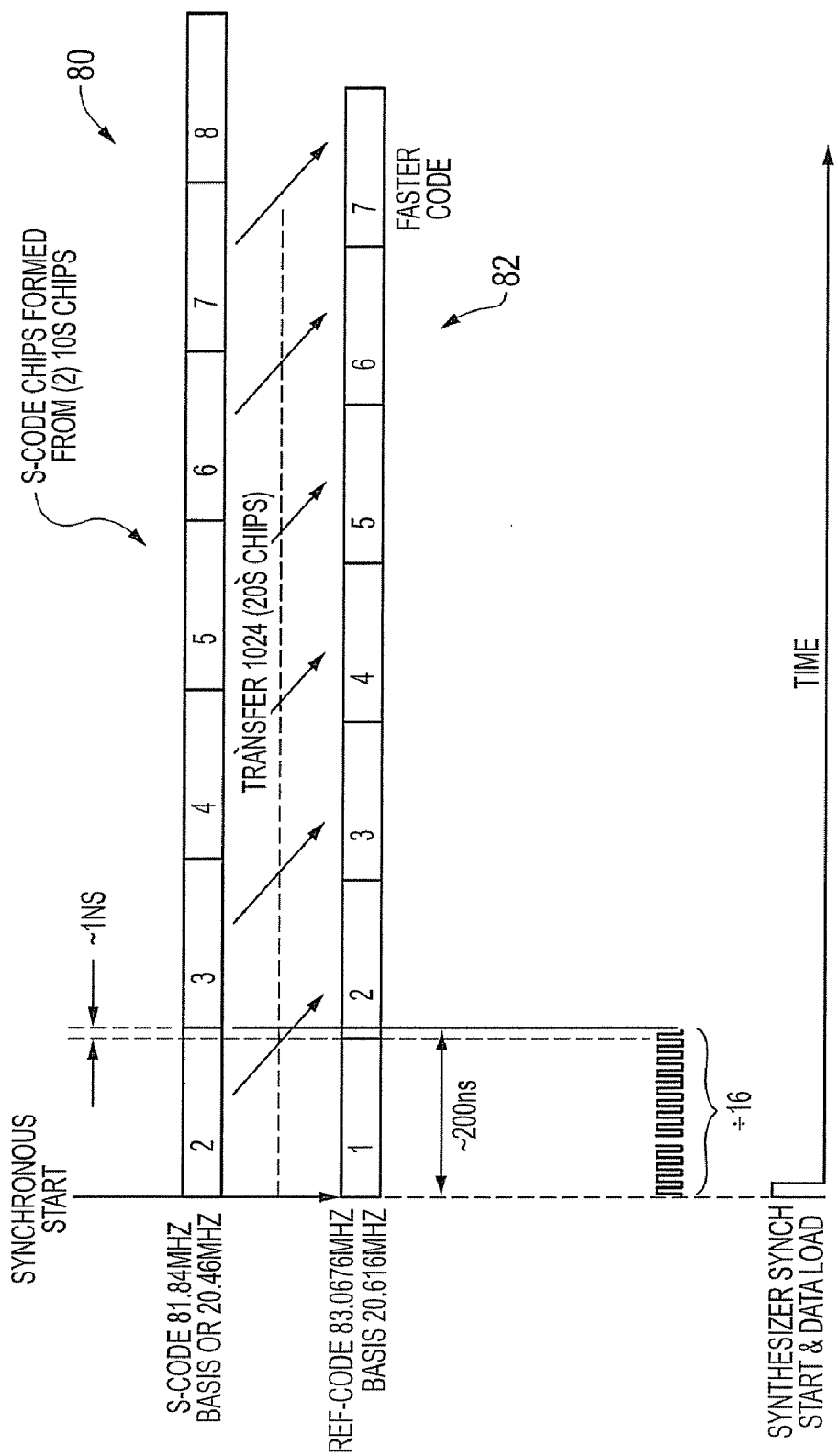
FIGS. 6A, 6B, and 6C are graphs of timing of data chips.
Figure 6B:
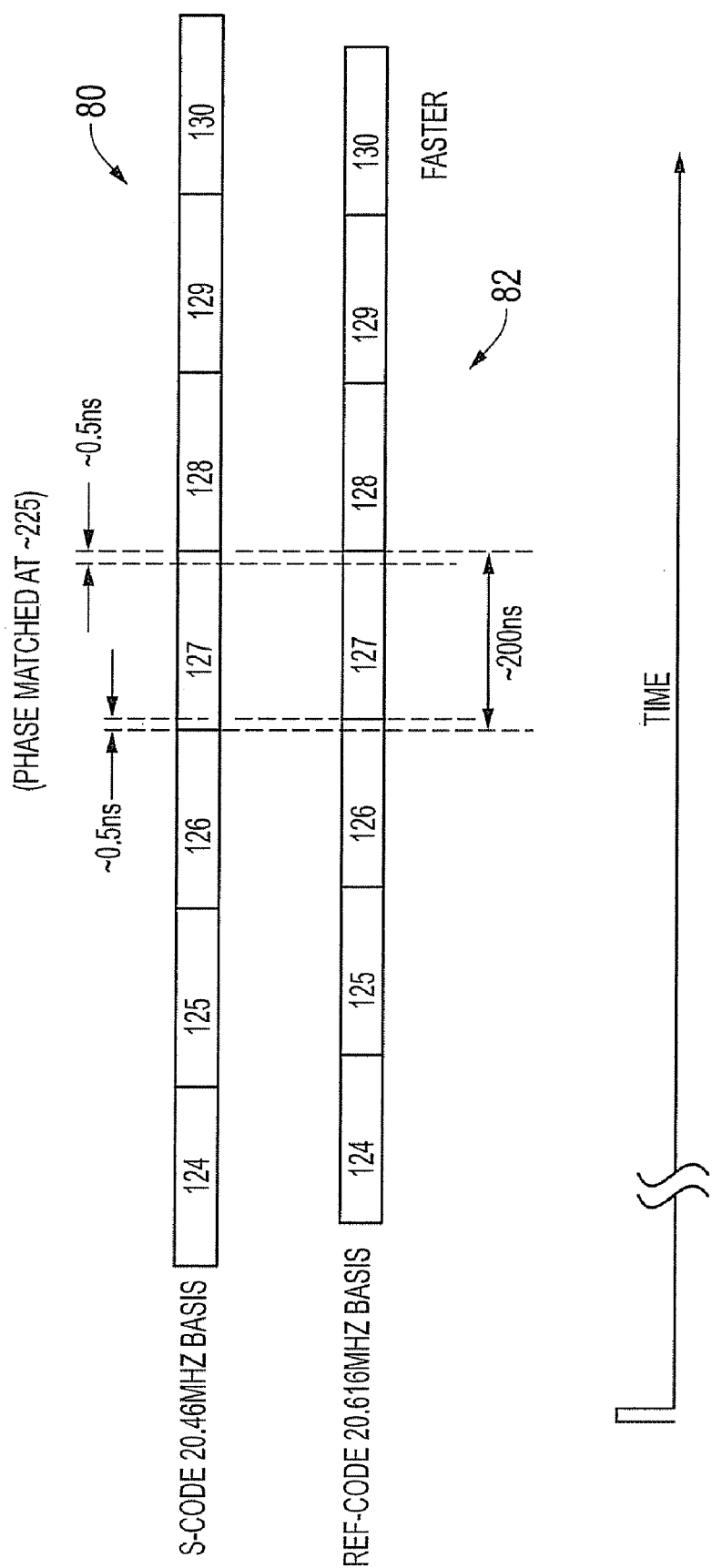
Figure 6C:
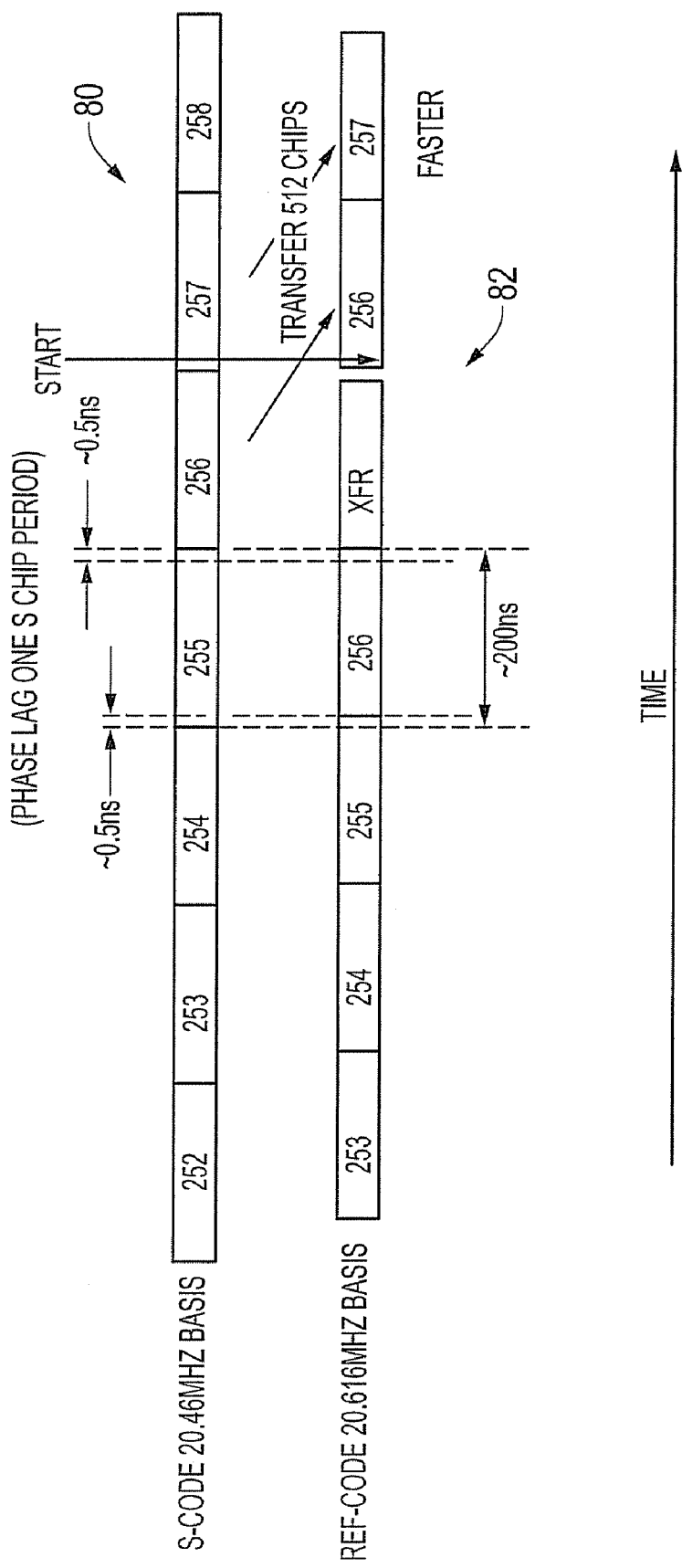

FIGS. 6A, 6B, and 6C illustrate a non-limiting example of timing of the reference data stream and the test data stream. The data streams shown are for S code chips. However, it will be appreciated that any other code format may be used as desired for a particular application. Each data chip is suitably around 200 nsec in length, although the data chips may have any length as desired for a particular application. Referring now to FIG. 6A, at a synchronous start, the output from the shift register 56 (FIG. 5) is loaded in parallel to the shift register 58 (FIG. 5). Data chips identified by their number in the test data stream (that is, the serial output of the shift register 56 (FIG. 5)) are shown along a time line 80. Data chips identified by their number for the test data stream, that is the serial output from the shift register 58 (FIG. 5), are shown along a timeline 82. In this non-limiting example, the S code data chips of the test data stream are output at a clock rate of 20.46 MHz, and the data chips of the serial reference data stream are output at a faster rate of 20.616 MHz. As previously mentioned, any output rate may be used as desired for a particular application. According to a particular embodiment, the reference data stream is output at a faster clock rate than the test data stream is output. This permits the reference data stream to "catch up" with the test data stream.

Referring now to FIG. 6B; it will be noted that at data chip 127, the faster reference data stream along the time line 82 has caught up with the test data stream along the time line 80. According to a particular embodiment, the correlator 36 (FIG. 2) performs a cross-correlation function on S code data chip number 127 of the test data stream (that is, the output of the transmitter 22) with S code data chip number 127 of the reference data stream (that is, the output of the shift register 58 (FIG. 5)) that has been modulated by the modulator 38 (FIG. 2).

Referring now to FIG. 6C, it will be noted that data chips in the faster reference data stream that are shown along the time line 82 have passed corresponding data chips in the test data stream that are shown along the time line 80. For example, at a point in time when data chip number 256 of the reference data stream is output by the shift register 58 (FIG. 5), data chip number 255 of the test data stream along the time line 80 is output from the shift register 56 (FIG. 5). Shortly thereafter, another synchronous start signal causes contents of the shift register 56 (FIG. 5) to be parallel loaded into the shift register 58 (FIG. 5) and the data chips of the reference data stream begin to catch up again with data chips of the test data stream.

Figure 7:
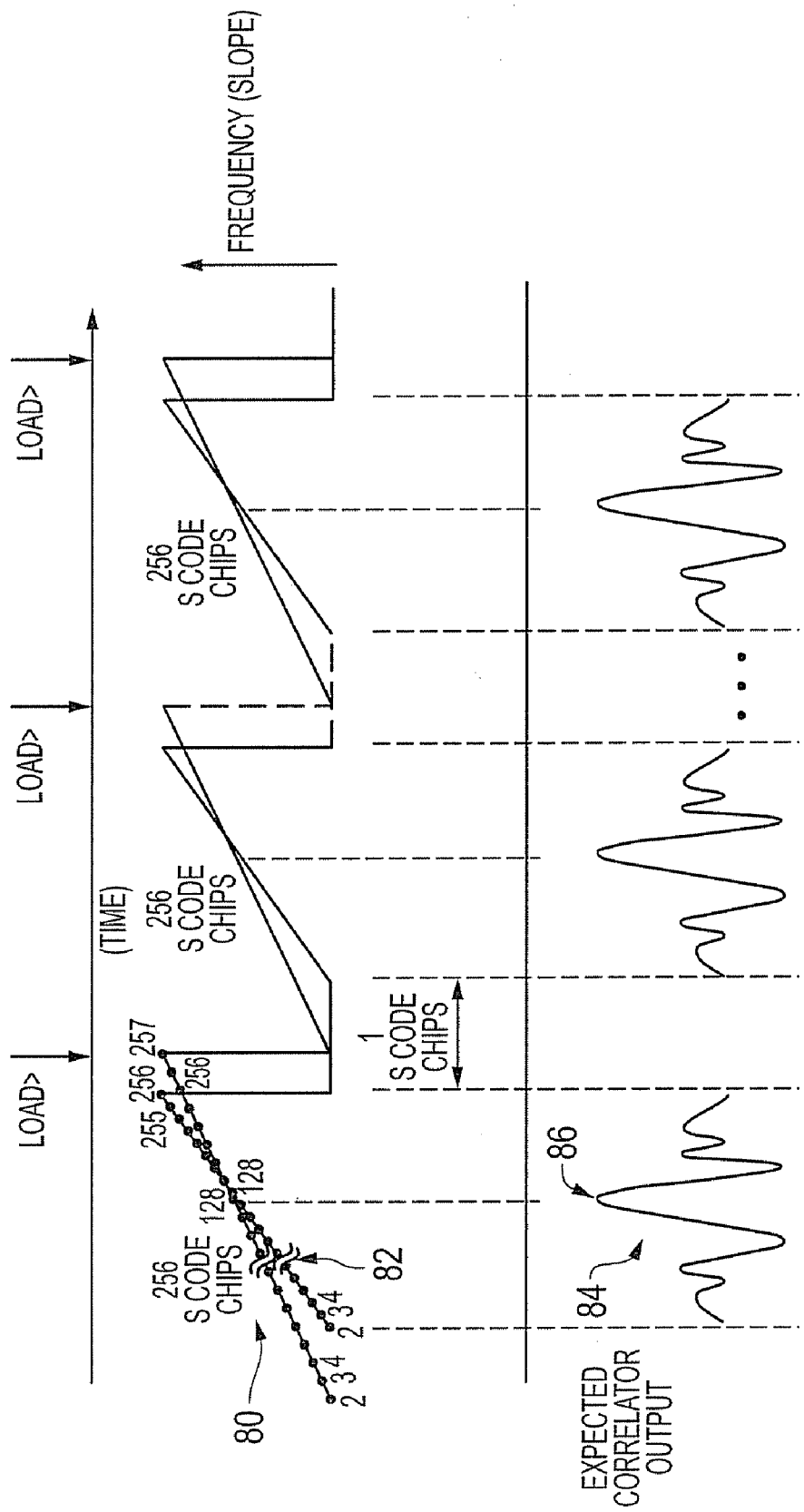
FIG. 7 is a comparison of codes and their correlation.

Referring now to FIG. 7, the numbered data chips of the test data stream shown along the time line 80 and, the numbered data chips of the reference data stream shown along the time line 82 coincide with each other at data chip number 128. Correlation results 84 that are output from the correlator 36 (FIG. 2) are graphically represented along a continuum as delayed data chips of the reference data stream on the time line 82 "catch up" with the slower data chips of the test data stream along the time line 80, coincide with each other at data chip number 128, and as the faster data chips of the reference data stream along the time line 82 "pass" the data chips of the test data stream along the time line 80. As expected, a correlation peak 86 occurs when the data chips of the reference data stream and the test data stream coincide at data chip number 128.

It will be appreciated that the relative output rates of the test data stream and the reference data stream may be reversed. That is, the test data stream may be serially output at a rate that is faster than the serial output rate of the reference data stream. In this alternate embodiment, the test data stream "catches up" with the reference data stream. This alternate embodiment is achieved simply by outputting the reference data stream from the shift register 56 (FIG. 5) and outputting the test data stream from the shift register 58 (FIG. 5).

Figure 8:
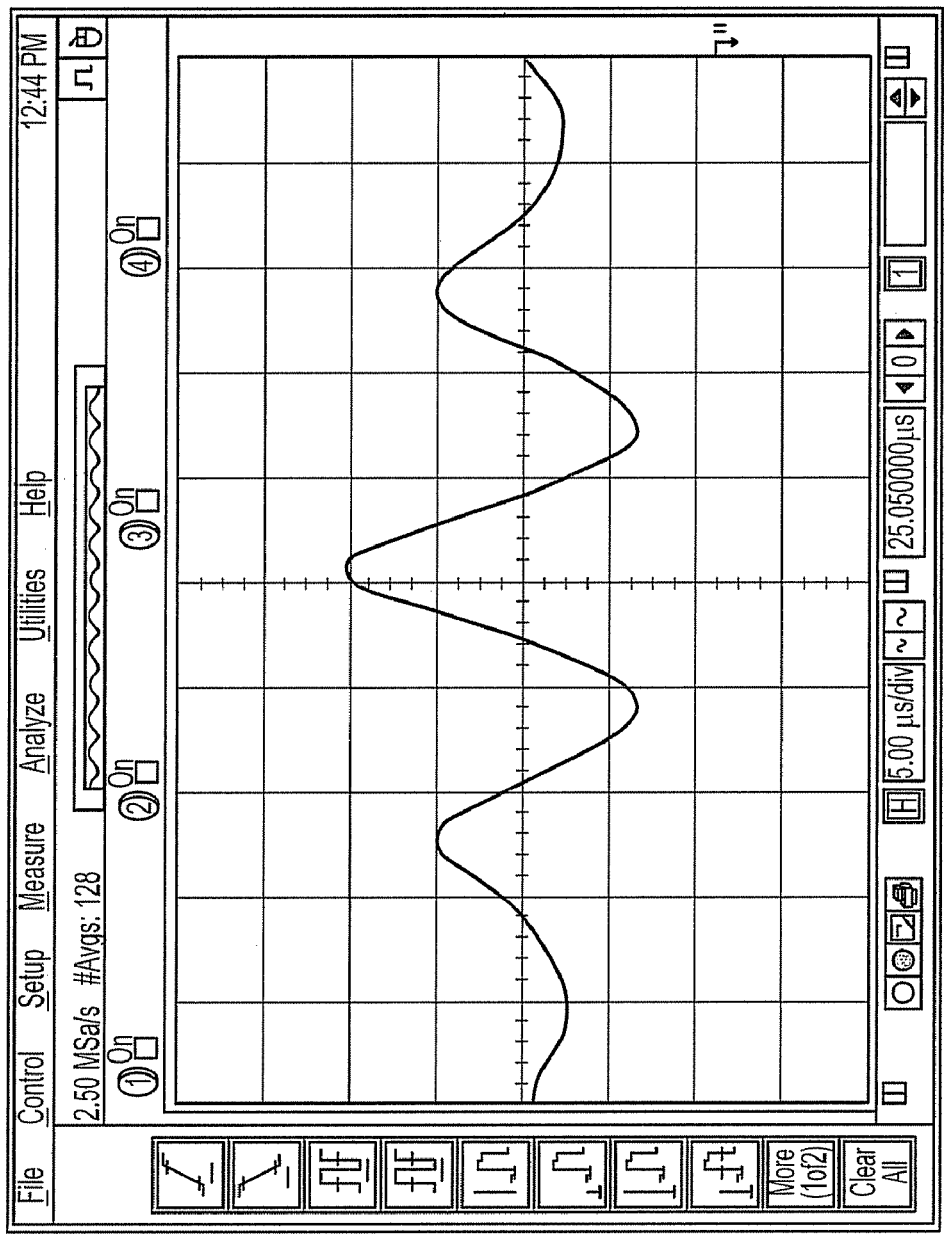
FIG. 8 is a screen shot of correlation of BOC (10,5) code.
Figure 9A:
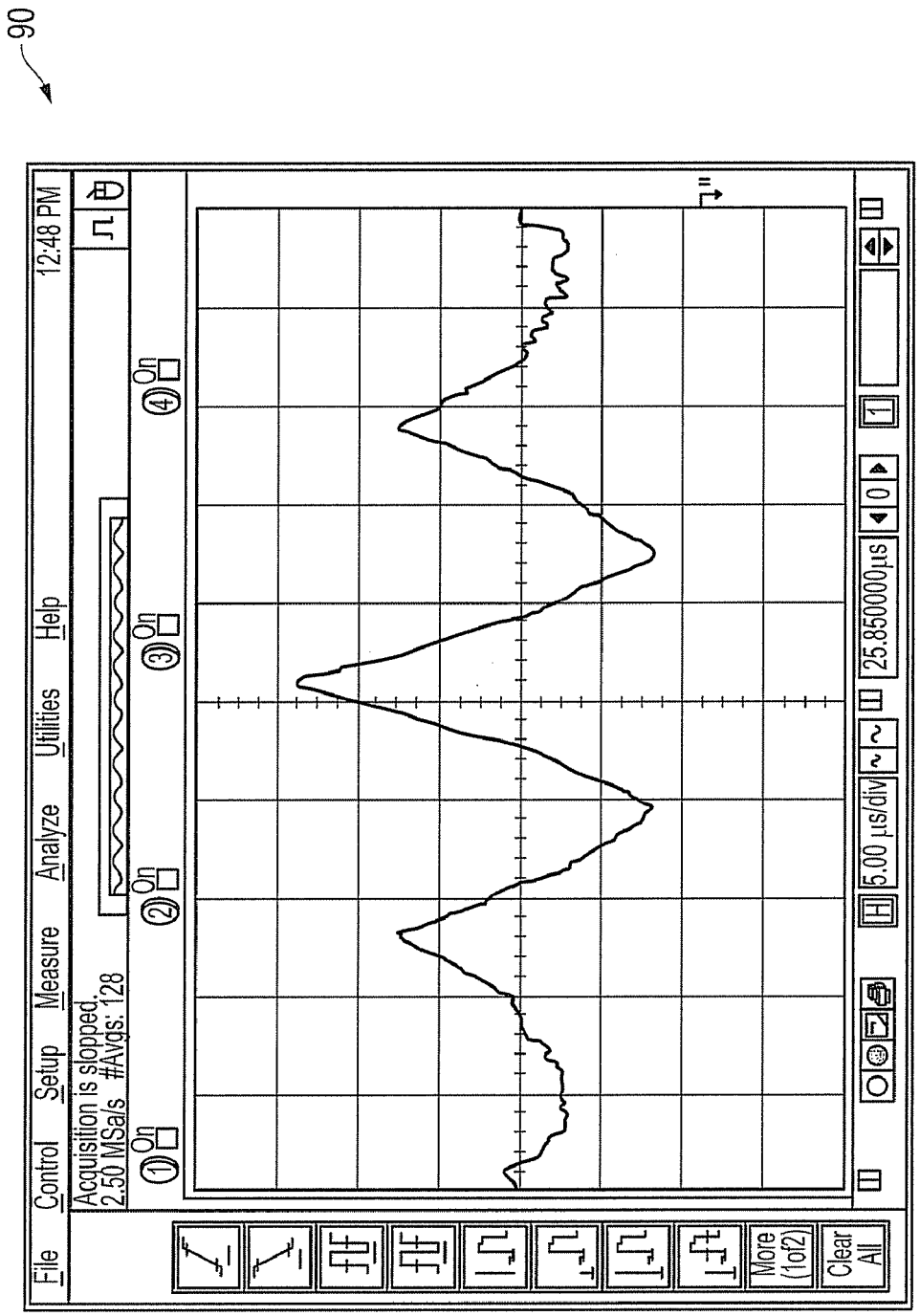

Particular embodiments advantageously performs correlation for a variety of code formats. For example, FIG. 8 shows a screen shot 88 of correlation of a 128 point sample of BOC (10,5) code displayed on an Infinium scope. By way of further example, FIG. 9A shows a screen shot 90 of correlation of a 2048 point sample of BOC (10,5) code as displayed on an Infinium scope.

Figure 9B:
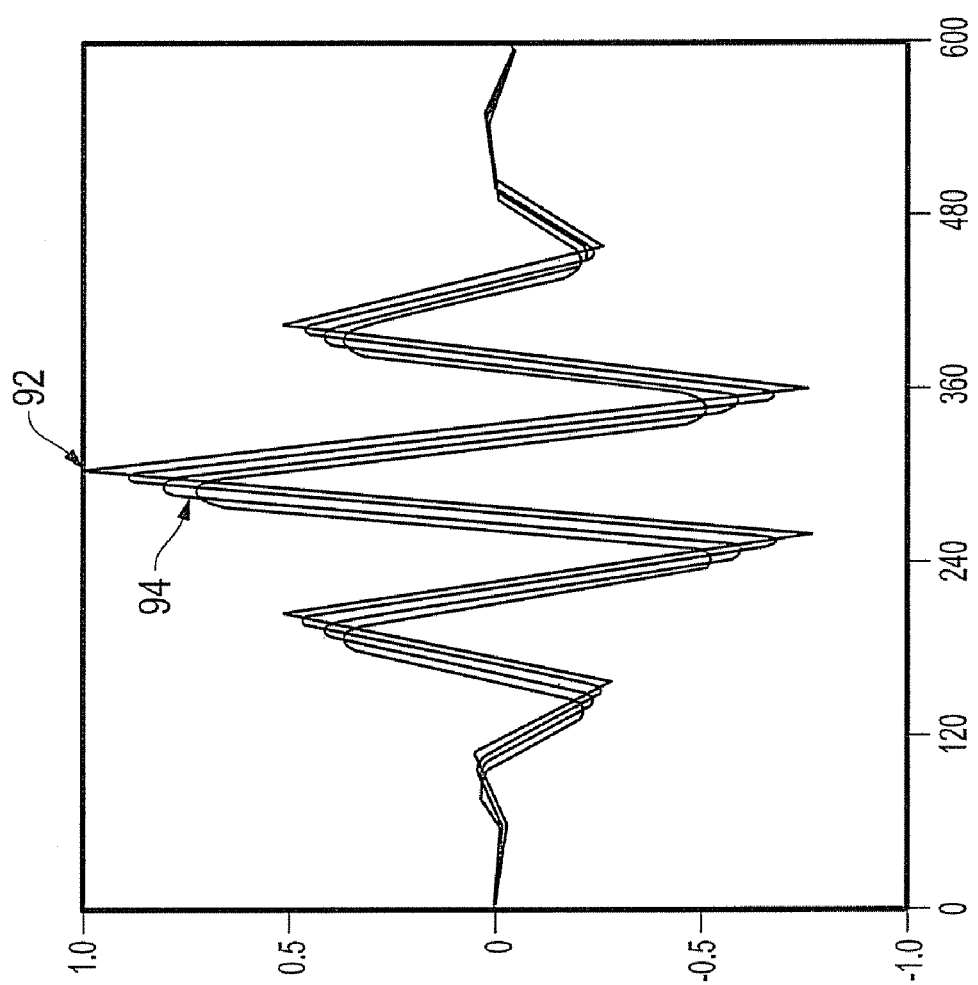

FIG. 9B shows details of correlation of BOC (10,5) code. A correlation peak 92 for correlation for two ideal data chips is normalized to a value of 1.0. However, variations in rise and fall times of data chips in the test data stream may occur as a result of processing by the transmitter 22 (FIG. 2). Accordingly, correlation peaks may have lower values than a normalized value of 1.0. Furthermore, correlation peaks may be shifted, or offset in time, as changes occur in the rise and fall times of the test data stream. For example, a correlation peak 94 has a value around 0.7 (that is, reduced from the normalized value 1.0 of the correlation peak 92 by around 0.3) and is shifted to the left from the correlation peak 92 by around 20 nanoseconds.

Advantageously, correlation peaks for a number of known conditions may be cataloged. From such a catalog, built-in-test functionality advantageously may be developed. Referring now to FIG. 9C, further correlation losses may be analyzed to provide the catalog of conditions for providing built-in-test functionality. For example, a correlation peak 96 occurs with an ideal carrier signal with an ideal duty cycle. However, correlation losses occur due to variations in duty cycle of the carrier utilized in the transmitter 22 (FIG. 2). For example, referring now to FIG. 9D, correlation peak 98 has a value of around 0.8 and experiences a time offset to the right of around 10 nanoseconds.

Figure 10:
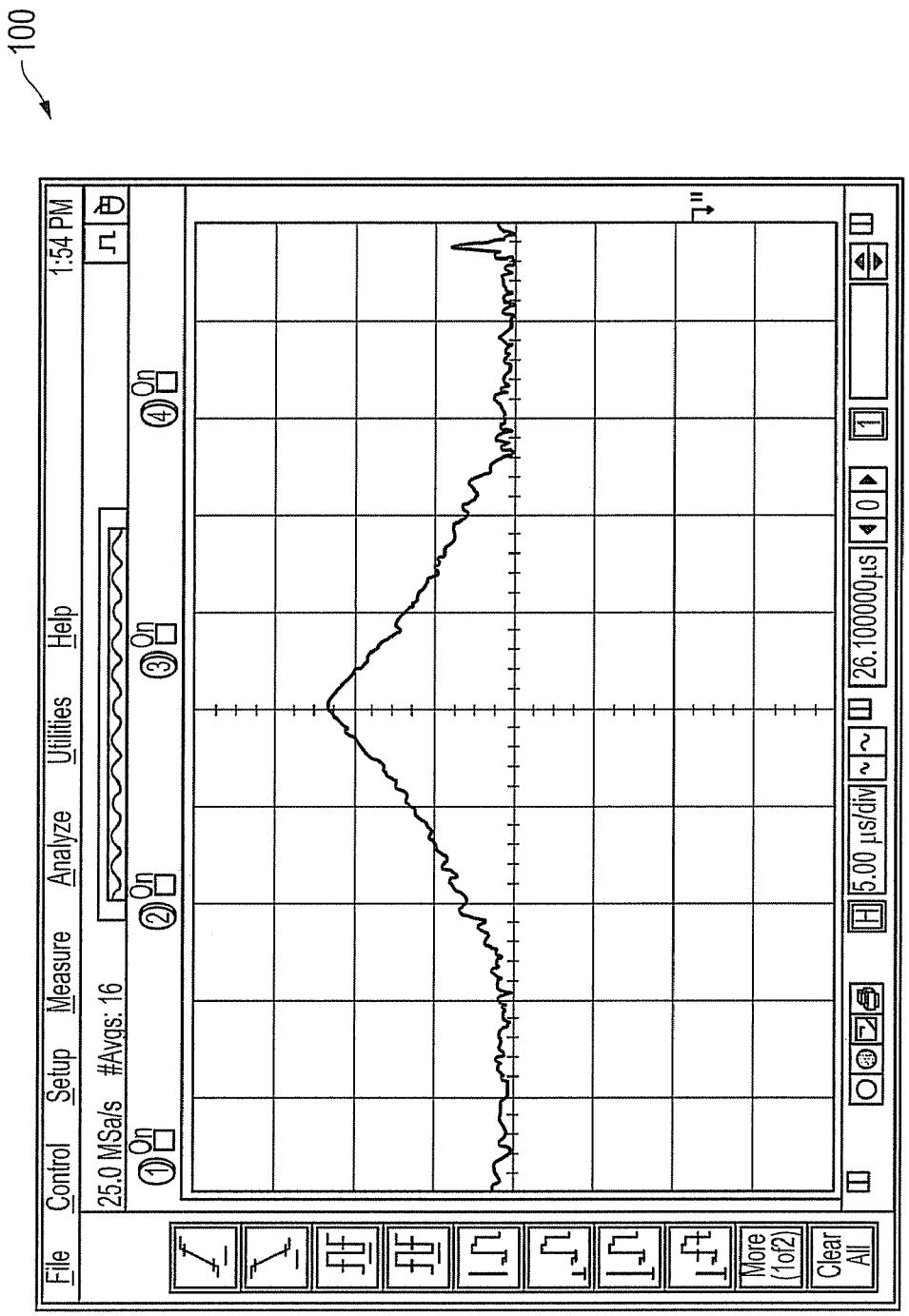
FIG. 10 is a screen shot of correlation of P code.
Figure 11:
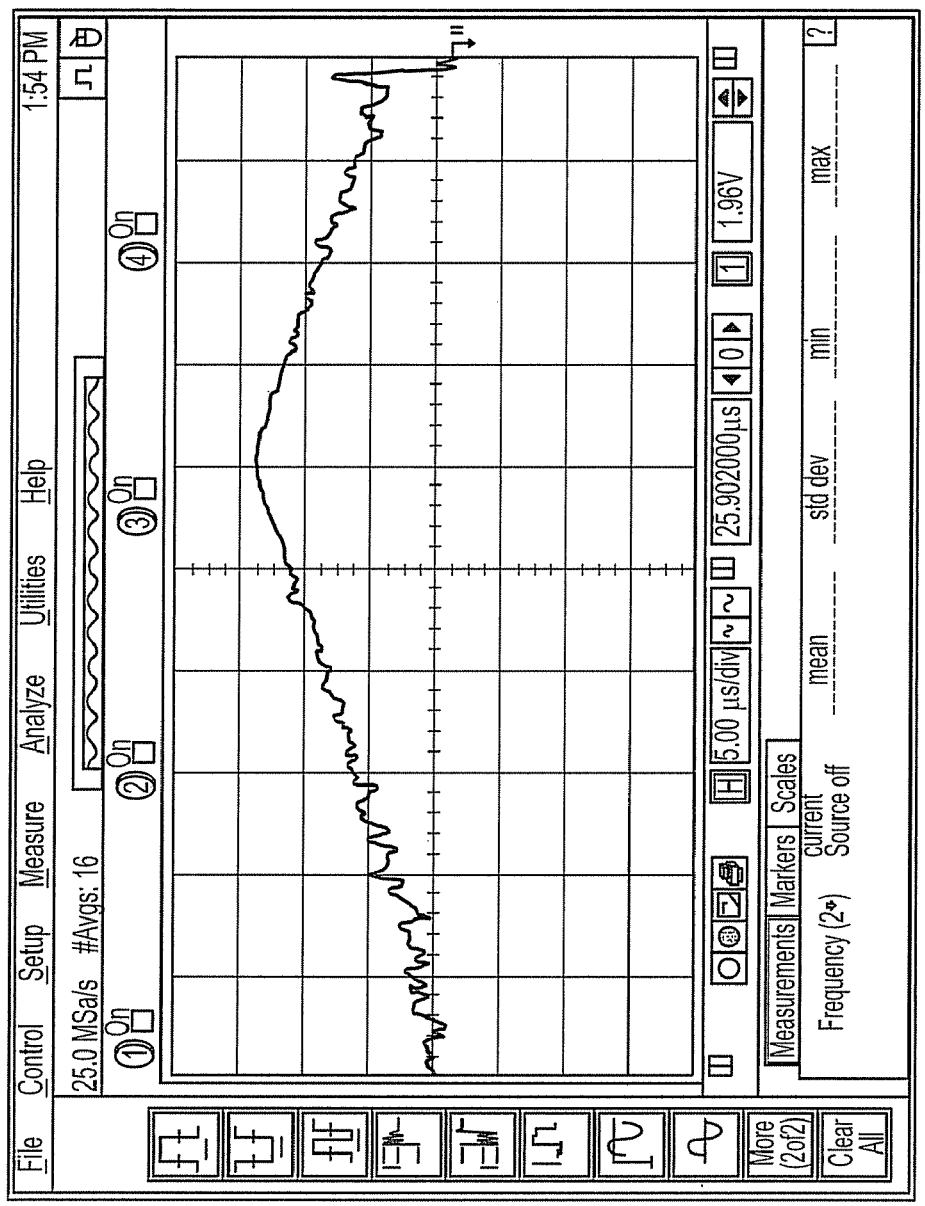
FIG. 11 is a screen shot of correlation of CA code.

FIG. 10 shows a screen shot 100 of correlation of 2048 point sample of P code as displayed on Infinium scope. FIG. 11 shows a screen shot 102 of correlation of 2048 point sample of CA code displayed on Infinium scope.

Figure 12:
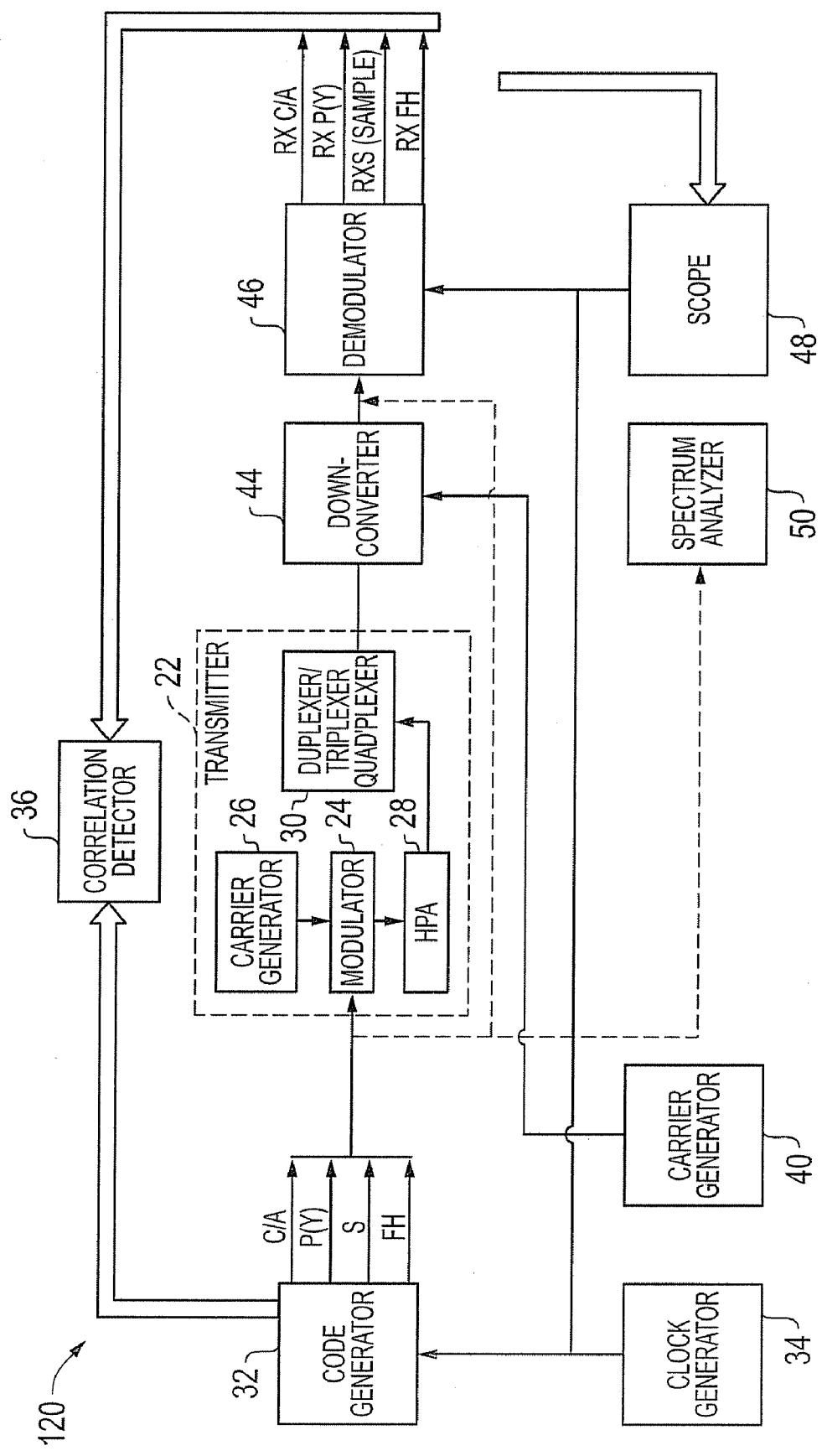
FIG. 12 is a high level block diagram of a system of an alternate embodiment.

Referring now to FIG. 12, a system 120 according to an alternate embodiment correlates an unmodulated reference data stream with recovered baseband signals of the test data stream. The system 120 includes the same components as the system 20 (FIG. 2), except the system 120 does not include the modulator 38 (FIG. 2). Accordingly, components of the system 120 retain the same reference numerals as the corresponding component of the system 20 (FIG. 2). For sake of brevity, details of construction and operation of the components of the system 120 need not be repeated for an understanding of the system 120.

The reference data stream is output from the shift register 58 (FIG. 5) (or, alternately, from the shift register 56 (FIG. 5)) of the code generator 32 as discussed above for the system 20. However, the reference data stream is provided directly to the correlator 36.

The test data stream is output from the shift register 56 (FIG. 5) (or, alternately, from the shift register 58 (FIG. 5)) of the code generator 32 as discussed above for the system 20. The test data stream is also provided to the modulator 24 of the transmitter 22 as described above for the system 20. In this alternate embodiment, the modulated output from the transmitter 22 is downconverted by the downconverter 44 and then demodulated by the demodulator 46 to recover a baseband signal. The recovered baseband signal is provided to the correlator 36. The correlator 36 correlates the reference data stream from the code generator 32 with the recovered baseband signal from the demodulator 46. The correlation is performed in the same manner as discussed above for the system 20.

While the preferred embodiment has been illustrated and described, as noted above, many changes can be made without departing from the scope of the disclosure. Accordingly, the scope of the invention is not limited by the disclosure of the preferred embodiment. Instead, the invention should be determined entirely by reference to the Claims that follow.

What is claimed is:

1. A system for evaluating electrical characteristics of a transmitter in real time, the system comprising:
   a code generator configured to generate reference code and test code, the reference code and test code each including a plurality of frames of data, the code generator being further configured to output the reference code at a first rate and to output the test code at a second rate that is different than the first rate;
   a modulator configured to modulate the reference code into a first modulated code; and
   a correlator configured to correlate the first modulated code with test code that has been modulated and transmitted by a transmitter as a second modulated code.

2. The system of claim 1, wherein the second rate is slower than the first rate.

3. The system of claim 1, wherein the second rate is faster than the first rate.

4. The system of claim 1, wherein the reference code and test code include binary offset carrier (BOC) modulation code.

5. The system of claim 1, wherein the reference code and test code include P code.

6. The system of claim 1, wherein the reference code and test code include CA code.

7. The system of claim 1, wherein the reference code and test code include frequency hop code.

8. The system of claim 1, wherein the transmitter includes a global positioning system (GPS) transmitter.

9. The system of claim 1, further comprising a display device configured to display correlation results.

10. The system of claim 1, wherein the correlator includes a digital sampling storage oscilloscope.

11. The system of claim 1, wherein the correlator includes an exclusive OR gate.

12. The system of claim 1, wherein the correlator includes an operational amplifier having summing inputs.

13. The system of claim 1, wherein the modulator is configured to be substantially matched to a modulator of the transmitter.

14. The system of claim 1, further comprising a filter to filter output of the modulator, wherein the filter is configured to be substantially matched to a filter of the transmitter.

15. The system of claim 1, further comprising a spectrum analyzer coupled to receive the first modulated code and the second modulated code and to analyze a frequency spectrum of the first modulated code and the second modulated code.

16. The system of claim 1, further comprising a computer interface to enable configuration of parameters of the reference code and the test code.

17. A method of evaluating electrical characteristics of a transmitter in real time, the method comprising:
   generating reference code and test code;
   outputting the reference code at a first rate;
   outputting the test code at a second rate that is different from the first rate;
   modulating the reference code into a first modulated code;
   providing the test code to a transmitter; and
   correlating the first modulated code with a second modulated code, wherein the second modulated code includes output of the transmitter based on the transmitter modulating the test code.

18. The method of claim 17, further comprising outputting a time domain data stream by down converting the second modulated code to a down-converted code and demodulating the down-converted code to demodulated code.

19. The method of claim 17, further comprising:
   determining correlation peaks of the first modulated code and the second modulated code; and
   comparing the correlation peaks to a catalog of correlations peaks of a plurality of known conditions.

* * * * *